United States Patent
Gironde

(10) Patent No.: US 10,843,667 B2
(45) Date of Patent: Nov. 24, 2020

(54) DEFLECTOR AND WIPER BLADE FOR A MOTOR VEHICLE

(71) Applicant: Valeo Systèmes d'Essuyage, Le Mesnil Saint Denis (FR)

(72) Inventor: Yvan Gironde, Issoire (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 66 days.

(21) Appl. No.: 16/068,982

(22) PCT Filed: Dec. 15, 2016

(86) PCT No.: PCT/EP2016/081315
§ 371 (c)(1),
(2) Date: Jul. 10, 2018

(87) PCT Pub. No.: WO2017/121574
PCT Pub. Date: Jul. 20, 2017

(65) Prior Publication Data
US 2019/0023230 A1   Jan. 24, 2019

(30) Foreign Application Priority Data

Jan. 12, 2016 (FR) ..................... 16 50232

(51) Int. Cl.
*B60S 1/38* (2006.01)
*B60S 1/04* (2006.01)

(52) U.S. Cl.
CPC ............. *B60S 1/3881* (2013.01); *B60S 1/381* (2013.01); *B60S 1/3808* (2013.01); *B60S 1/3879* (2013.01); *B60S 1/0408* (2013.01); *B60S 2001/3836* (2013.01)

(58) Field of Classification Search
CPC ...... B60S 2001/3836; B60S 2001/3837; B60S 1/3806; B60S 1/3808; B60S 1/381; B60S 1/3881; B60S 1/0408; B60S 1/3879; B62D 35/007; B62D 37/00; B62D 37/02
USPC .................................................... 15/250.201
See application file for complete search history.

(56) References Cited

FOREIGN PATENT DOCUMENTS

| DE | 4314414 | * | 11/1994 |
| DE | 101 11 757 A1 | | 9/2002 |
| DE | 102006057231 | * | 6/2008 |
| DE | 10 2013 202036 A1 | | 8/2014 |

(Continued)

OTHER PUBLICATIONS

Machine translation of description portion of French publication 2967116, published May 2012. (Year: 2012).*

(Continued)

*Primary Examiner* — Gary K. Graham
(74) *Attorney, Agent, or Firm* — Osha Bergman Watanabe & Burton LLP

(57) ABSTRACT

The present invention concerns a deflector (2; 20) for a wiper blade (1; 10) for a motor vehicle, made from a flexible material characterised in that it is split longitudinally by a groove (11; 110) communicating with a longitudinal cavity (8; 80) of the deflector (2; 20) in such a way as to form two half-foil members (2a, 2b; 20a, 20b) that can assume a deformed position in which the deformed half-foil members (2a, 2b; 20a, 20b) increase the deflection surface area of the deflector (2; 20). The present invention also concerns a wiper blade (1; 10) comprising such a deflector (2; 20).

12 Claims, 2 Drawing Sheets

(56) References Cited

FOREIGN PATENT DOCUMENTS

FR          2 967 116  A1      5/2012
WO       2009/000738        * 12/2008

OTHER PUBLICATIONS

International Search Report issued in PCT/EP2016/081315 dated Feb. 15, 2017 (2 pages).
Written Opinion of the International Searching Authority issued in PCT/EP2016/081315 dated Feb. 15, 2017 (5 pages).

* cited by examiner

DEFLECTOR AND WIPER BLADE FOR A MOTOR VEHICLE

The invention relates to a spoiler for a wiper blade for a motor vehicle. The invention also relates to a wiper blade for a motor vehicle comprising the said spoiler.

So-called flat blade wiper blades are formed by a semi-rigid assembly which retains the blade along its entire length.

They generally comprise one or a plurality of splines made of metal or hard polymer, in order to provide the wiper blade with intrinsic curvature. They also comprise a spoiler which has an aerodynamic profile formed such that the relative wind which is produced by the travel of the vehicle produces a force which tends to place the wiper blade on the glass panel.

The spoiler generally has a widened base which ends in a narrow tip offset to one side of the base. This asymmetrical profile makes it possible to optimise the support surface for the incident flow of air.

An objective of the present invention is to increase the deflection surface of the spoiler at least under the effect of an incident flow of air. Another objective of the present invention is to simplify the lines of fitting of the wiper blade on the vehicle during production.

For this purpose, the present invention relates to a spoiler for a wiper blade of a motor vehicle made of flexible material, characterised in that it is split longitudinally by a slot which communicates with a longitudinal cavity in the spoiler, such as to form two half-fins which can adopt a deformed position in which the deformed half-fins increase the deflection surface of the spoiler.

The longitudinal cavity makes it possible to provide the half-fins with the flexibility necessary for them to be able to be deformed resiliently under the effect of the incident flow of air. Thus, when the vehicle is travelling, the relative wind which is produced by the travel of the vehicle deforms the half-fins of the spoiler. The half-fins are inclined in the direction of the incident flow of air, such that the support surface of the spoiler which deflects the incident air, also known as the deflection surface, is increased by an uncovered portion of half-fin. The top of the deformed spoiler is inscribed in an asymmetrical aerodynamic form, in which the support surface which deflects the incident air during the travel of the vehicle is increased relative to the support surface of the incident air of the spoiler in the position of rest. The relative increase in the deflection surface of the spoiler makes it possible to improve substantially the placing of the wiper blade on the glass panel, and therefore the efficiency of the spoiler.

A hollow spoiler is also easier to extrude and cheaper to produce since it has less material.

The deflection surface in the deformed position can be increased by at least 5%.

According to one embodiment, the half-fins can adopt a position of rest in which they face one another symmetrically.

In addition, in the position of rest, a symmetrical spoiler makes it possible to avoid having to take into account a direction for the arrangement of the spoiler on the vehicle, since the incident flow of air will deform the spoiler in the same way in both directions. This therefore simplifies the lines of fitting, since the symmetrical spoiler can be positioned in one direction or the other. Also, the same symmetrical spoilers can be used on the driver's side and on the passenger's side for butterfly wiping systems. This therefore reduces significantly the number of reference points.

According to one or more characteristics of the spoiler, taken alone or in combination:
- in the position of rest, the transverse cross-section of the longitudinal cavity has the form of a droplet;
- in the position of rest, the top of the spoiler is inscribed in an isosceles triangle;
- in the position of rest, the top of the spoiler is extended by a vertical tip;
- in the deformed position, an end of one half-fin is supported on the other half-fin;
- the spoiler comprises a securing element for securing the spoiler on a blade or on at least one spline;
- the spoiler is formed integrally with a blade of a wiper blade;
- the spoiler comprises two longitudinal lateral grooves which are designed to receive a respective spline;
- the spoiler comprises two first hooks opposite one another in order to receive a spline;
- the spoiler is obtained by moulding or extrusion of one or more materials.

The invention also relates to a wiper blade, characterised in that it comprises a spoiler as previously described.

Other characteristics and advantages of the invention will become apparent from the following description, provided by way of example on a non-limiting basis, with reference to the appended figures, in which.

Figure 1:
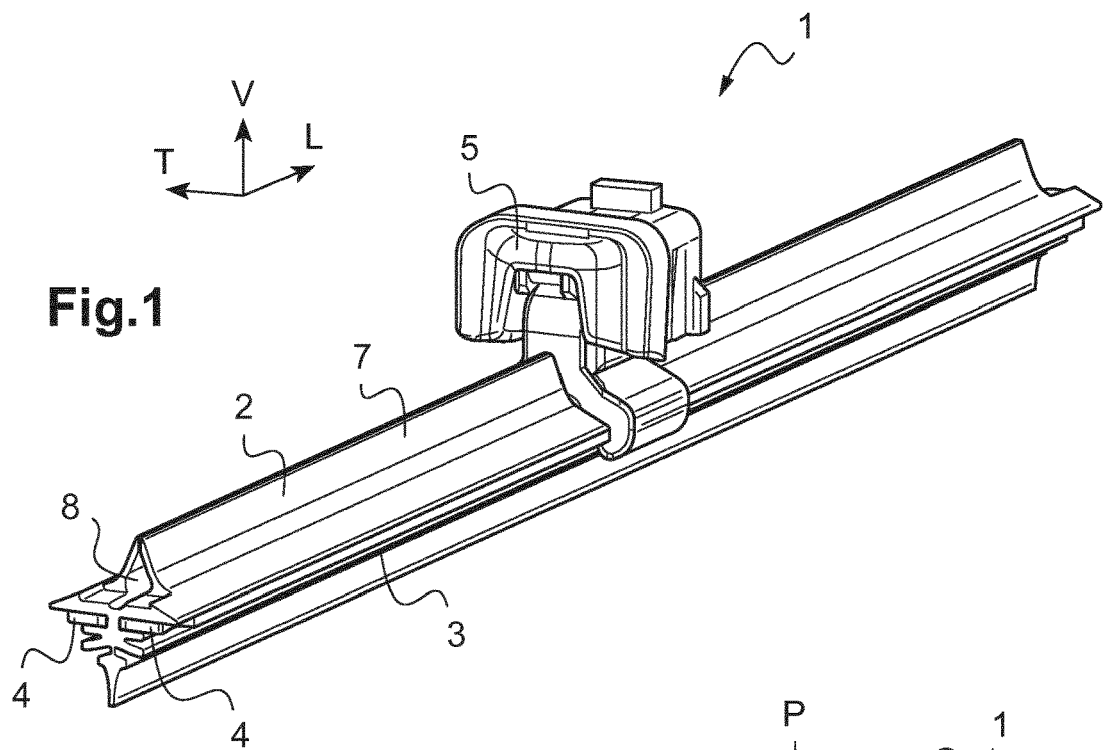
FIG. 1 is a schematic representation in perspective of a wiper blade according to a first embodiment.

Hereinafter in the description, on an non-limiting basis, longitudinal, vertical and transverse directions will be adopted as indicated in FIG. 1 by the trihedron (L, V, T) which is fixed relative to the wiper blade 1. The longitudinal direction L corresponds to the main direction of the wiper blade. In the following description, elements which are identical or similar will be designated by the same reference numbers.

The following embodiments are examples. Although the description refers to one or more embodiments, this does not necessarily mean that each reference concerns the same embodiment, or that the characteristics apply only to a single embodiment. Simple characteristics of different embodiments can also be combined or interchanged in order to provide other embodiments.

FIG. 1 represents a wiper blade 1 for a motor vehicle. The wiper blade 1 is a blade of the flat blade type, with a main longitudinal orientation L.

The wiper blade 1 comprises a spoiler 2, a blade 3 and two splines 4.

The spoiler 2 and the blade 3 are made of flexible material.

The spoiler 2 can be obtained by moulding or extrusion of one or more materials.

In this first embodiment, the spoiler 2 and the blade 3 are produced in a single piece. They can also be formed by one or more materials. The spoiler 2 and the blade 3 produced in a single piece can also be obtained by moulding or by extrusion of one or more materials.

The wiper blade 1 also comprises a connector 5 for fitting and articulation of the wiper blade 1 on the free end of a drive arm. In this example, the spoiler 2 is formed by a single longitudinal element on which the connecter 5 is fitted, but it can also comprise two elements arranged one on each side of the connector 5.

Figure 2:
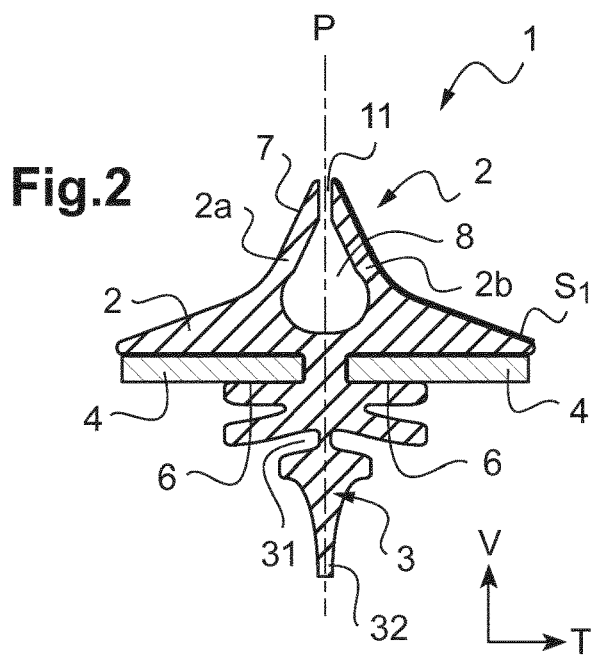
FIG. 2 shows a transverse cross-section of the wiper blade in FIG. 1, the spoiler of which is in the position of rest.

Shown more clearly in FIG. 2, the blade 3 has a longitudinal recess 31 which allows it to pivot relative to the longitudinal axis L at each change of direction when the wiper blade 1 is activated against the glass surface. The fine free end 32 of the blade 3 is designed to be in contact with the glass surface to be wiped.

The spoiler 2 and the blade 3 in a single piece are joined with the formation of two longitudinal lateral grooves 6. Each longitudinal lateral groove 6 receives a respective spline 4.

The spline 4 is formed by a body in a single piece, comprising for example a flat metal strip which in particular is curved vertically, such that, when the wiper blade 1 is supported on the glass panel, the support forces exerted by the drive arm are distributed along the entire length of the blade 3.

Channels (not represented) for circulation of a windscreen washer fluid open into spray orifices which can also be added onto the spoiler 2 or provided in the body of the spoiler 2.

The spoiler 2 is split longitudinally by a slot 11 which communicates with longitudinal cavity 8 in the spoiler 2, such as to form two longitudinal half-fins 2a, 2b. The half-fins 2a, 2b of the spoiler 2 can be made of identical or different materials.

Figure 3:
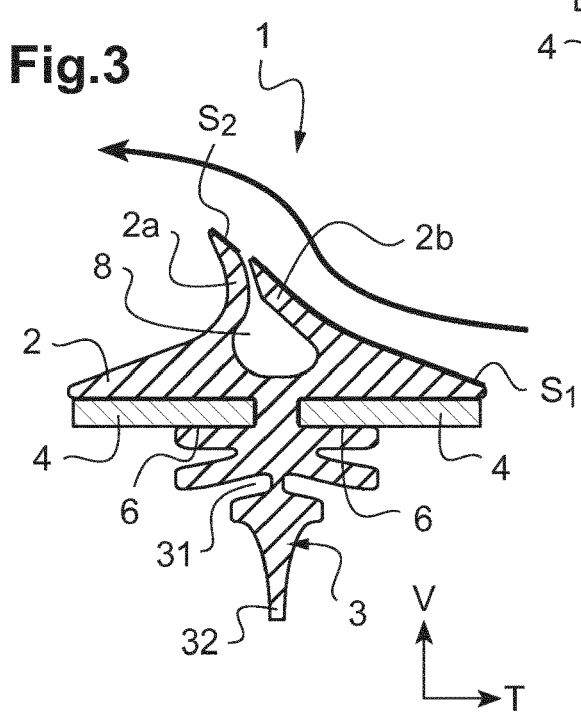
FIG. 3 is a view similar to FIG. 2 with the spoiler in the deformed position.

The half-fins 2a, 2b can adopt a position of rest (FIG. 2) or a deformed position (FIG. 3) in which the half-fins 2a, 2b, deformed under the effect of the wind produced by the travel of the vehicle, increase the deflection surface of the spoiler 2.

The spoiler 2 is split at the top 7 such as to open the top of the longitudinal cavity 8. The open longitudinal cavity 8 makes it possible to provide the two half-fins 2a, 2b with the flexibility necessary for them to be able to be deformed resiliently under the effect of the incident flow of air. In addition, a hollow spoiler 2 is easier to extrude and cheaper to produce because it has less material.

In this embodiment, the blade 3 and the spoiler 2 have a longitudinal plane of symmetry P at rest (FIG. 2). The spoiler 2 is split according to the longitudinal plane of symmetry P of the wiper blade 1, such that, in the position of rest, the half-fins 2a, 2b are symmetrical, and face one another symmetrically.

The top 7 of the spoiler 2 is thus inscribed for example in a transverse cross-section with an asymmetrical form, such as an isosceles triangle.

The transverse cross-section of the longitudinal cavity 8 thus also has a symmetrical form, such as the form of a droplet (FIG. 2), or any other symmetrical form, such as a disc or a triangle (not represented).

A spoiler 2 which is symmetrical in the position of rest makes it possible to avoid having to take into account a direction for the arrangement of the spoiler 2 on the vehicle, since the incident flow of air will deform the spoiler 2 in the same way in both directions. This therefore simplifies the lines of fitting, since the symmetrical spoiler 2 can be positioned in one direction or the other. Also, the same symmetrical spoilers 2 can be used on the driver's side and on the passenger's side for butterfly wiping systems. This therefore reduces significantly the number of reference points.

When the vehicle is at a standstill, the spoiler 2 has a symmetrical form (FIG. 2).

Then, when the vehicle is travelling, the relative wind which is produced by the travel of the vehicle (schematised by an arrow in FIG. 3) deforms the half-fins 2a, 2b of the spoiler 2. One end of a half-fin 2b is inclined towards the other half-fin 2a, which is inclined in the same direction of the incident flow of air. The support surface of the spoiler 2 which deflects the incident air (or deflection surface) is thus formed firstly by the back S1 of one half-fin 2a, and secondly by an inner face portion S2 of the other half-fin 2b, which is then uncovered. In the deformed position, the deflection surface S1, S2 can for example be increased by at least 5% relative to the deflection surface S1 in the position of rest.

The top 7 of the deformed spoiler 2 is thus inscribed in an asymmetrical aerodynamic form in which the support surface which deflects the incident air during the travel of the vehicle is increased (FIG. 3) relative to the support surface of the incident air of the spoiler in the position of rest (FIG. 2). The relative increase of the deflection surface of the spoiler 2 makes it possible to improve substantially the placing of the wiper blade 1 on the glass panel, and thus the efficiency of the spoiler 2.

Figure 4:
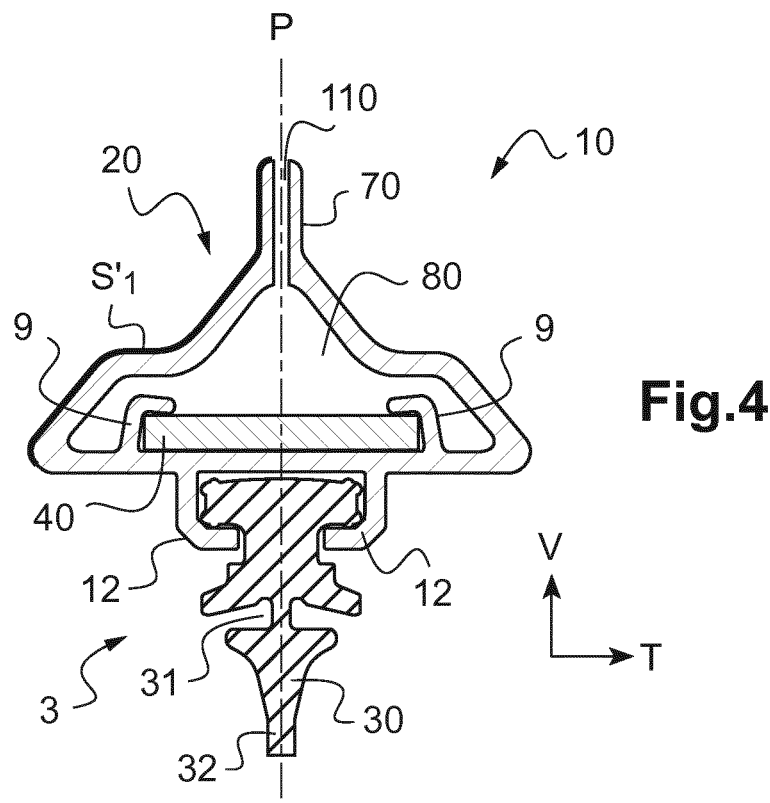
FIG. 4 shows a transverse cross-section of a wiper blade according to a second embodiment, the spoiler of which is in the position of rest.
Figure 5:
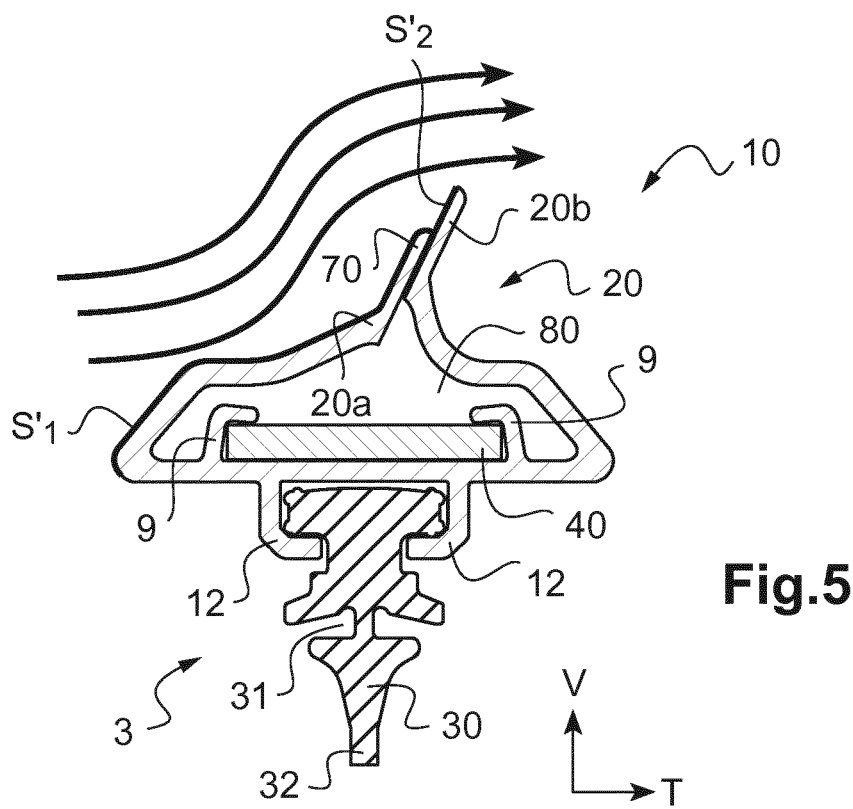
FIG. 5 is a view similar to FIG. 4 with the spoiler in the deformed position.

FIGS. 4 and 5 represent a second embodiment of the wiper blade 10 of the flat blade type.

The wiper blade 10 comprises a spoiler 20, a blade 30 and a single spline 40.

The spoiler 20 and the blade are 30 formed by two distinct elements.

The spoiler 20 additionally comprises a securing element which is configured to secure the spoiler 20 on a blade 30 or on at least one spline 4; 40, such as an element for securing by gluing, by clipping on or by force fitting.

The securing element comprises for example two first, upper hooks 9, which are arranged opposite one another in order to receive the spline 40.

The securing element comprises for example two second, lower hooks 12, which are arranged opposite one another in order to receive a back of the blade 30. The two first hooks 9 thus surmount the two second hooks 12.

The spoiler 20 is split longitudinally, with the slot 110 communicating with longitudinal cavity 80 in the spoiler 20, such as to form two half-fins 20a, 20b which can adopt a position of rest (FIG. 4), and a deformed position (FIG. 5), in which the deformed half-fins 20a, 20b increase the deflection surface of the spoiler 20.

The spoiler 20 is split at its top 70, according to the longitudinal plane of symmetry P in the position of rest, thus opening a longitudinal cavity 80 in the spoiler 2 (FIG. 4).

In this embodiment, in the position of rest (FIG. 4), the split top 70 of the spoiler 20 is extended by a vertical tip. The half-fins 20a, 20b have a narrower transverse thickness than the base of the spoiler 2, such that they can be deformed more easily under the effect of the force of the incident flow of air than the thicker base of the spoiler 20.

Thus, when the vehicle is at a standstill, the spoiler 20 has a symmetrical top 70 (FIG. 4).

Then, when the vehicle is travelling, the relative wind which is produced by the travel of the vehicle (schematised by arrows in FIG. 5) deforms the half-fins 20a, 20b of the spoiler 20. The half-fins 20a, 20b are then inclined by resilient deformation, with the inner faces of the vertical tip of the top 70 being offset relative to one another by inclining the spoiler 20 to one side.

In the deformed position, an end of one half-fin 20a is supported on the other half-fin 20b. The surface which deflects the air is then formed by the back S1' of one half-fin 20a as well as a portion of inner face S2' of the other half-fin 20b which is then on view. The top 70 of the deformed spoiler 20 is thus inscribed in an asymmetrical aerodynamic form in which the surface which deflects the air is increased (FIG. 5). In the deformed position, the deflection surface S1', S2' can for example be increased by at least 5% relative to the deflection surface S1' in the position of rest.

Although the two embodiments described relate to a spoiler 2; 20 which is symmetrical in the position of rest, the invention also relates to an asymmetrical spoiler which is split longitudinally, with the slot communicating with a longitudinal cavity in the spoiler, such as to form two half-fins which can adopt a deformed position in which the deformed half-fins increased the deflection surface of the spoiler (not represented).

The invention claimed is:

1. A spoiler for a wiper blade of a motor vehicle made of flexible material, the spoiler comprising:
    a longitudinal cavity;
    a slot that communicates with the longitudinal cavity in the spoiler and that splits the spoiler longitudinally,
    wherein the slot splits the spoiler longitudinally to form two symmetrical half-fins which adopt a position of rest or a deformed position,
    wherein the two symmetrical half-fins adopt the deformed position upon receiving an incident flow of air to increase a deflection surface of the spoiler, and
    wherein, in the deformed position, the two symmetrical half-fins engage one another to close the slot by inclining the two symmetrical half-fins in a direction of the incident flow of air.

2. The spoiler according to claim 1, wherein the deflection surface in the deformed position is increased by at least 5%.

3. The spoiler according to claim 1, wherein the two symmetrical half-fins can adopt the position of rest in which they face one another symmetrically.

4. The spoiler according to claim 3, wherein, in the position of rest, the transverse cross-section of the longitudinal cavity has the form of a droplet.

5. The spoiler according to claim 3, wherein, in the position of rest, a top of the spoiler is inscribed in an isosceles triangle.

6. The spoiler according to claim 1, wherein, in the position of rest, a top of the spoiler is extended by a vertical tip.

7. The spoiler according to claim 1, wherein, in the deformed position, an end of one half-fin is supported on the other half-fin.

8. The spoiler according to claim 1, further comprising a securing element for securing the spoiler on a blade or on at least one spline.

9. The spoiler according to claim 1, wherein the spoiler is formed integrally with a blade of a wiper blade.

10. The spoiler according to claim 1, wherein the spoiler is obtained by moulding or extrusion of one or more materials.

11. A wiper blade comprising the spoiler according to claim 1.

12. A spoiler for a wiper blade of a motor vehicle made of flexible material, the spoiler comprising:
    a longitudinal cavity;
    a slot that communicates with the longitudinal cavity in the spoiler and that splits the spoiler longitudinally from a tip of a top of the spoiler to the longitudinal cavity,
    wherein the slot splits the spoiler longitudinally to form two symmetrical half-fins which adopt a position of rest or a deformed position,
    wherein the two symmetrical half-fins adopt the deformed position to increase a deflection surface of the spoiler, and
    wherein, in the deformed position, the two symmetrical half-fins engage one another to close the slot by inclining the two symmetrical half-fins in a same direction.

* * * * *